(No Model.)

G. M. VAN RIPER & J. O. ST. CLAIR.
HOSE COUPLING.

No. 297,880. Patented Apr. 29, 1884.

WITNESSES:
Dom Twitchell.
C. Sedgwick

INVENTOR:
G. M. Van Riper
J. O. St. Clair
BY Munn & Co
ATTORNEYS.

UNITED STATES PATENT OFFICE.

GARRITT M. VAN RIPER AND JAMES O. ST. CLAIR, OF REPUBLIC, MICHIGAN.

HOSE-COUPLING.

SPECIFICATION forming part of Letters Patent No. 297,880, dated April 29, 1884.

Application filed October 9, 1883. (No model.)

*To all whom it may concern:*

Be it known that we, GARRITT M. VAN RIPER and JAMES O. ST. CLAIR, of Republic, in the county of Marquette and State of Michigan, have invented a new and useful Improvement in Hose-Couplings, of which the following is a full, clear, and exact description.

This invention relates to that description of hose-couplings in which, working on a pivot upon opposite sides of one section of the coupling, is a lever handle-piece having hooks at its one end, arranged to engage with pins on opposite sides of the other section of the coupling; and it consists in a combination, with the said handle-piece, of links connecting it with the side pivots, and a rubber or elastic packing interposed between the meeting-end portions of the coupling-sections, whereby when the handle-piece is closed to lock the coupling its link-connection serves, first, to compress said packing, and afterward, as said connection passes the culmination-point, to admit of said packing yielding and holding the handle-piece in its locked position and the coupling-sections securely closed, substantially as hereinafter described.

Reference is to be had to the accompanying drawings, forming a part of this specification, in which similar letters of reference indicate corresponding parts in all the figures.

Figure 1:
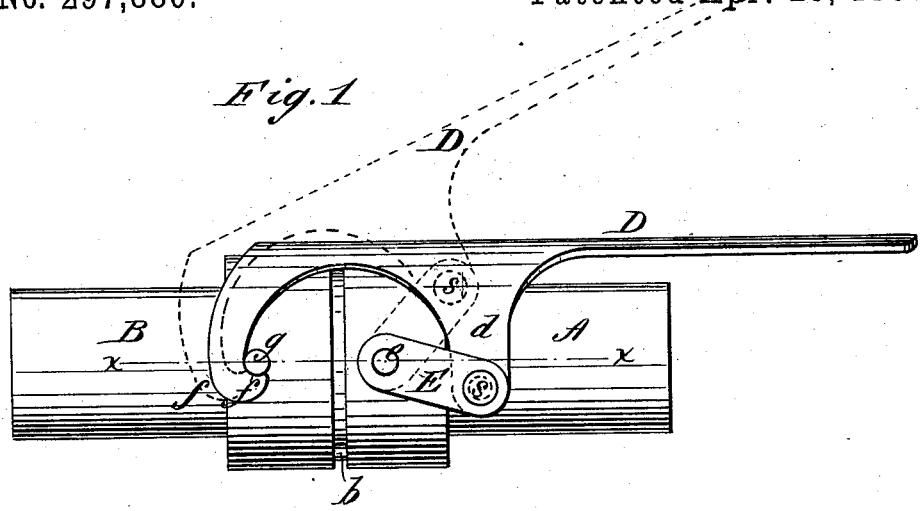
Figure 2:
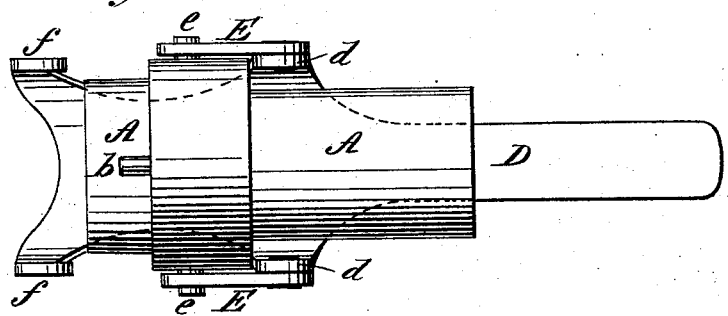
Figure 3:
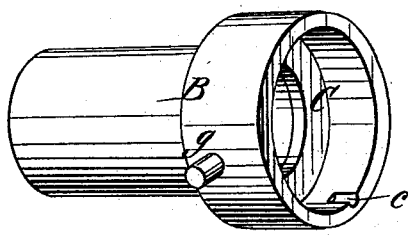

Figure 1 represents a side view of our improved hose-coupling closed, showing also by dotted lines the handle-piece in position for opening the coupling. Fig. 2 is a longitudinal view, looking in a direction at right angles to Fig. 1, of one of the coupling-sections, with its attached locking-handle piece; and Fig. 3, a view in perspective of the other coupling-section.

A indicates the male section of the coupling, and B the female section thereof, arranged to enter one within the other at their meeting-end portions, as usual, and provided—that is, the one section, A, with one or more lugs or guides, b, and the other section, B, with one or more corresponding recesses, c, for said lugs or guides to enter when putting the coupling together, for the purpose of adjusting the coupling-sections into proper relation with each other and holding the coupling in place while coupling.

C is a rubber or other elastic packing-ring inserted within the enlarged head of the female section B for the entering end of the male section A of the coupling to bear against when closing the coupling.

D is the lever handle-piece for locking and unlocking the coupling. This handle-piece is arranged to run, when closed, lengthwise of the coupling upon the one side of it, and to partly encircle the same. It is made with two opposite side ears, $d\ d$, intermediately of its length in extended partial encircling relation with the coupling, and to the extremities of which are pivoted links E E, that are connected at their opposite ends to central pivots, $e\ e$, on opposite sides of the head or meeting-end portion of the coupling-section A. Said handle-piece D is furthermore constructed at its inner end with opposite side hooks or hooked-shaped extensions, $f\ f$, which hooks engage with opposite central side studs or pins, $g\ g$, on the coupling-section B.

To close the coupling after its two sections A B have been brought together, the hooks $f\ f$ of the handle-piece D are engaged with the pins $g\ g$, and said handle-piece shut down or inward till the pivoted connections $s\ s$ of the links E E pass beyond the culminating-point of the links relatively to their pivots $e\ e$ and the locking-pins $g\ g$, or, in other words, beyond a straight line, $x\ x$, drawn to centrally intersect said pivots and pins. In this action the elastic packing-ring C will first be compressed by the entered portion of the male section A of the coupling; but afterward, and as the pivoted connections $s\ s$ of the links pass their culminating-point, as described, will slightly yield and serve to hold the handle-piece in its locked position and the coupling-sections securely closed.

To unlock the coupling, it is only necessary to move outward the handle-piece D, as shown by dotted lines in Fig. 1, and to move it so that the hooks $f\ f$ will pass out of the way of the locking-pins $g\ g$, when or after which the coupling-sections A B may be drawn apart. A single motion of the one hand will serve to either couple or uncouple the device, which will be found to constitute an extremely simple, efficient, and quickly-acting hose-coupling.

Having thus described our invention, we claim as new and desire to secure by Letters Patent—

The combination, with the male and female sections A B of the coupling, of the elastic packing-ring C, the locking-pins $g$ on the one section, the pivots $e$ on the adjacent section in like central longitudinal line with the coupling as the pins $g$, the handle-piece D, constructed with hooks $f$ at its one end for engagement with said pins, and the links E, uniting said handle-piece with the pivots $e$, for operation in connection with the elastic ring C, substantially as shown and described.

GARRITT M. VAN RIPER.
JAMES O. ST. CLAIR.

Witnesses:
 JOS. GIBSON,
 E. E. WEISER.